US007977606B2

(12) United States Patent
Adachi et al.

(10) Patent No.: US 7,977,606 B2
(45) Date of Patent: Jul. 12, 2011

(54) HEAT-TRANSER-MEDIUM HEATING APPARATUS AND VEHICULAR AIR-CONDITIONING APPARATUS USING THE SAME

(75) Inventors: Tomoyasu Adachi, Aichi-ken (JP); Mikihiko Ishii, Aichi-ken (JP); Nobuya Nakagawa, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 467 days.

(21) Appl. No.: 11/892,449

(22) Filed: Aug. 23, 2007

(65) Prior Publication Data

US 2008/0053981 A1 Mar. 6, 2008

(30) Foreign Application Priority Data

Aug. 30, 2006 (JP) ................................ 2006-234151

(51) Int. Cl.
*B60L 1/02* (2006.01)
*H05B 3/78* (2006.01)

(52) U.S. Cl. ....................................... 219/202; 392/495

(58) Field of Classification Search .................. 219/202, 219/208; 392/495, 496; 165/41, 42; 237/12.3 R, 237/12.3 A, 12.3 B
See application file for complete search history.

(56) References Cited

U.S. PATENT DOCUMENTS 5,598,502 A * 1/1997 Takahashi et al. ............ 392/502
5,995,711 A 11/1999 Fukuoka et al.
6,037,567 A * 3/2000 Inoue et al. ................... 219/202
6,392,207 B2 5/2002 Beetz et al.
6,952,524 B2 * 10/2005 Bissonnette et al. .......... 392/484
6,957,013 B2 * 10/2005 Zimmer ........................ 392/397
2002/0011484 A1 1/2002 Beetz et al.
2003/0132222 A1 7/2003 Bohlender
2003/0183619 A1 10/2003 Bohlender et al.
2004/0169027 A1 9/2004 Bohlender et al.
2005/0061798 A1 3/2005 Uhl
2005/0230377 A1 10/2005 Bohlender et al.

(Continued)

FOREIGN PATENT DOCUMENTS

DE 4433814 A1 3/1996

(Continued)

OTHER PUBLICATIONS

Office Action dated Dec. 14, 2009 issued in corresponding German Patent Application No. 102007040526.1-16.

(Continued)

*Primary Examiner* — Sang Y Paik
(74) *Attorney, Agent, or Firm* — Westerman, Hattori, Daniels & Adrian, LLP

(57) ABSTRACT

The invention provides a heat-transfer-medium heating apparatus using a PTC heater and a vehicular air-conditioning apparatus using such a heating apparatus, which have superior heat-conducting properties and ease of assembly, which can improve the heating capacity, and which can ensure sufficient electrical insulation. Included are a PTC heater having a stacked construction in which an electrode plate, an incompressible insulating layer, and a compressible heat-conducting layer are sequentially provided on each side of a PTC element so as to sandwich the PTC element; and heat-transfer-medium circulating boxes, respectively disposed in close contact with the two surfaces of the PTC heater and having circulating channels for the heat-transfer-medium formed therein. The heat transfer medium circulating inside the heat-transfer-medium circulating boxes is heated by radiant heat from the two surfaces of the PTC heater.

10 Claims, 6 Drawing Sheets

U.S. PATENT DOCUMENTS

| | | | |
|---|---|---|---|
| 2007/0068913 | A1 | 3/2007 | Zeyen et al. |
| 2007/0068914 | A1 | 3/2007 | Zeyen et al. |
| 2007/0068927 | A1 | 3/2007 | Bohlender et al. |

FOREIGN PATENT DOCUMENTS

| | | | |
|---|---|---|---|
| DE | 198 35 229 | A1 | 2/1999 |
| JP | 7-304325 | A | 11/1995 |
| JP | 11-151926 | A | 6/1999 |
| JP | 2000-272332 | A | 10/2000 |
| JP | 2002-283835 | A | 10/2002 |
| JP | 2003-104041 | A | 4/2003 |
| JP | 2004-140114 | A | 5/2004 |
| JP | 2006-196766 | A | 7/2006 |

OTHER PUBLICATIONS

Japanese Office Action dated Mar. 15, 2011, issued in correspinding Japanese Patent Application No. 2006-234151.

* cited by examiner

HEAT-TRANSER-MEDIUM HEATING APPARATUS AND VEHICULAR AIR-CONDITIONING APPARATUS USING THE SAME

BACKGROUND OF THE INVENTION

1. Field of the Invention

The present invention relates to a heat-transfer-medium heating apparatus for heating a heat transfer medium using a positive temperature coefficient (PTC) heater, and to a vehicular air-conditioning apparatus using the same.

This application is based on Japanese Patent Application No. 2006-234151, the content of which is incorporated herein by reference.

2. Description of Related Art

One known heat-transfer-medium heating apparatus for heating a heat transfer medium in the related art is an apparatus using a PTC heater, in which a PTC thermistor device (PTC element) is used as a heat-generating element.

In a PTC heater, which exhibits a PTC thermistor characteristic, the resistance increases as the temperature increases, and the temperature rise is moderated as the consumed current is controlled by this increase in resistance. Thereafter, the temperature of and current consumed by the heat-generating part reach a saturation region where they are stabilized. The PTC heater thus exhibits a self-controlled temperature property.

As described above, the PTC heater has a property whereby the current consumed decreases as the temperature of the heater rises, and then when it reaches a constant-temperature saturation region, the current consumed stabilizes at a low value. Making use of this property can afford an advantage in that it is possible to reduce the electrical power consumption, as well as preventing an abnormal rise in the temperature of the heat-generating part.

Because they exhibit such features, PTC heaters are used in numerous technical fields. In the field of air conditioning, for example, vehicular air-conditioning apparatuses, they have also been proposed for use in a heating apparatus for heating a heat transfer medium (in this case, engine coolant) supplied to a radiator for heating air (for example, see Japanese Unexamined Patent Application, Publication No. 2003-104041).

In the technology described in Japanese Unexamined Patent Application, Publication No. 2003-104041, an indentation for placing the PTC heater is provided in a compartment wall dividing the flow path of a fluid, and the PTC heater is disposed in this indentation to heat the coolant flowing in the flow path via the compartment wall.

In this case, although it is possible to increase the heat-conducting surface area in the fluid flow path, there is inevitably some difficulty in assembling the structure by inserting the PTC element, serving as the heat-generating element, in the indentation and placing it in close contact with the surface of the compartment wall. Therefore, this approach has some problems that must be overcome, such as heat-conduction to the fluid flow path, the ease of assembly, and so forth.

In addition, when the heating apparatus described above is employed in the air-conditioning apparatus of an electric car, a high voltage, for example, 300 V, is applied to the PTC heater. Therefore, one critical issue is ensuring sufficient electrical insulation between the PTC heater and the fluid flow path. However, this issue is not described at all in Japan Unexamined Patent Application, Publication No. 2003-104041.

BRIEF SUMMARY OF THE INVENTION

The present invention has been conceived in light of the circumstances described above, and an object thereof is to provide a heat-transfer-medium heating apparatus using a PTC heater and a vehicular air-conditioning apparatus using such a heating apparatus, which have superior heat-conduction properties and ease of assembly, which can improve the heating capacity, and which can ensure sufficient electrical insulation.

In order to overcome the problems described above, the heat-transfer-medium heating apparatus of the present invention and the vehicular air-conditioning apparatus using the same employ the following solutions.

A heat-transfer-medium heating apparatus according to a first aspect of the present invention includes a PTC heater having a stacked construction in which an electrode plate, an incompressible insulating layer, and a compressible heat-conducting layer are sequentially provided on each surface of a PTC element so as to sandwich the PTC element; and heat-transfer-medium circulating boxes, respectively disposed in close contact with the two surfaces of the PTC heater and having circulating channels for the heat-transfer-medium formed therein, wherein the heat transfer medium circulating inside the heat-transfer-medium circulating boxes is heated by radiant heat from the two surfaces of the PTC heater.

According to the first aspect described above, because it is possible to heat the heat transfer medium circulating in the heat-transfer-medium circulating boxes with the radiant heat from both surfaces of the PTC heater, it is possible to increase the radiant heat efficiency of the PTC heater and improve the heating performance. Because of the stacked structure in which the heat-transfer-medium circulating boxes are placed in close contact with the two surfaces of the PTC heater, it is possible to assemble the PTC heater and the heat-transfer-medium circulating boxes in close contact. Therefore, it is possible to improve the heat-conduction properties and the ease of assembly. In addition, because the PTC heater has a stacked construction in which the electrode plates, the incompressible insulating layers, and the compressible heat-conducting layers are sequentially provided on both surfaces of the PTC element, the thermal resistance between the PTC element and the heat-transfer-medium circulating box can be reduced, thus increasing the heat-conduction properties, and it is also possible to ensure sufficient electrical insulation therebetween. In particular, because the PTC heater and the heat-transfer-medium circulating boxes can be assembled in close contact by utilizing the compressibility of the compressible heat-conducting layers, it is possible to improve the contact properties therebetween. Thus, it is possible to further improve the heat-conducting properties and to absorb dimensional tolerance in assembly.

In the heat-transfer-medium heating apparatus according to the first aspect described above, the heat-transfer-medium circulating channels in the heat-transfer-medium circulating boxes provided at the two surfaces of the PTC heater may communicate with each other.

According to the heat-transfer-medium heating apparatus having this configuration, the heat-transfer-medium circulating channels in the heat-transfer-medium circulating boxes provided on both surfaces of the PTC heater communicate with each other. Therefore, it is possible to increase the contact length between the heat-transfer-medium circulating channels and the PTC heater. As a result, it is possible to increase the heating performance of the heat transfer medium.

In the heat-transfer-medium heating apparatus according the first aspect described above, a board accommodating box may be provided on the surface of one of the heat-transfer-medium circulating boxes, at the opposite side from the surface contacting the PTC heater, and a control board configured to control the PTC heater may be accommodated inside the board accommodating box.

According to the heat-transfer-medium heating apparatus having this configuration, the board accommodating box is provided on the surface of one of the heat-transfer-medium circulating boxes, at the opposite side from the surface in contact with the PTC heater, and the control board for controlling the PTC heater is accommodated inside the board accommodating box. Therefore, the control board on which the heat-generating components, for example, field effect transistors (FETs), are provided can be forcibly cooled by the heat transfer medium circulating in the heat-transfer-medium circulating box. As a result, the control board can be thermally stabilized, thus improving the heat resistance and reliability thereof.

In the heat-transfer-medium heating apparatus according to the first aspect described above, heat-generating components provided on the control board may be disposed in the vicinity of an inlet in the heat-transfer-medium circulating channel in the heat-transfer-medium circulating box.

According to the heat-transfer-medium having this configuration, because the heat-generating components such as the FETs provided on the control board are disposed close to the inlet side of the heat-transfer-medium circulating channel in the heat-transfer-medium circulating box, the heat-generating components such as the FETs can be efficiently cooled by comparatively low-temperature heat transfer medium before it is heated by the PTC heater.

In the heat-transfer-medium heating apparatus according the first aspect described above, the heat-generating components may be disposed in contact with a portion that is cooled by the heat transfer medium circulating through the heat-transfer-medium circulating box.

According to the heat-transfer-medium heating apparatus having this configuration, because the heat-generating components are disposed in contact with the portion cooled by the heat-transfer medium circulating in the heat-transfer-medium circulating box, heat generated by the heat-generating components such as the FETs can be radiated to the heat transfer medium via the portion in contact with the heat-transfer-medium circulating box. Therefore, it is possible to directly cool the heat-generating components such as FETs by heat conduction, which enables the cooling efficiency of the heat-generating components to be increased, thus improving the heat resistance and reliability thereof.

In the heat-transfer-medium heating apparatus according the first aspect described above, the compressible heat-conducting layers may be formed of insulating material.

According to the heat-transfer-medium heating apparatus having this configuration, because the compressible heat-conducting layers are formed of insulating material, it is possible to form a double insulating layer structure in conjunction with the incompressible insulating layers. Therefore, the electrical insulation between the electrode plates, to which a high voltage is applied, and the heat-transfer-medium circulating boxes can be enhanced, thus improving the reliability thereof.

In the heat-transfer-medium heating apparatus according the first aspect described above, a surface area of the incompressible insulating layers may be larger than a surface area of the electrode plates.

According to the heat-transfer-medium heating apparatus having this configuration, because the surface area of the incompressible insulating layers is larger than the surface area of the electrode layers, short circuiting can be prevented between the PTC elements and electrode plates, to which a high voltage is applied, and the heat-transfer-medium circulating boxes, and it is possible to further increase the electrical insulation.

In the heat-transfer-medium heating apparatus according the first aspect described above, when the compressible heat-conducting layers are formed of insulating material, or when the surface area of the incompressible insulating layers are larger than the surface area of the electrode plates, a surface area of the compressible heat-conducting layers may be larger than the surface area of the incompressible insulating layers.

According to the heat-transfer-medium heating apparatus having this configuration, because the surface area of the compressible heat-conducting layers is larger than the surface area of the incompressible insulating layers, short circuiting can be reliably prevented between the PTC elements and electrode plates, to which a high voltage is applied, and the heat-transfer-medium circulating boxes, thus increasing the electrical insulation and improving the reliability thereof.

In the heat-transfer-medium heating apparatus according to the first aspect described above, a plurality of the PTC elements may provided, which are configured to be controllable on and off in units of individual PTC elements.

According to the heat-transfer-medium heating apparatus having this configuration, because a plurality of PTC elements are provided, which are configured so as to be controllable on and off in units of individual PTC elements, it is possible to adjust the heating capacity by suitably controlling the plurality of PTC elements on and off. Therefore, it is possible to easily control the capacity of the PTC heater according to the load.

A vehicular air-conditioning apparatus according to a second aspect of the present invention includes a blower configured to circulate outside air or vehicle cabin air; a cooler provided at a downstream side of the blower; and a radiator provided at a downstream side of the cooler, wherein a heat-transfer-medium heated by any one of the heat-transfer-medium heating apparatuses described above is configured so as to be capable of circulating in the radiator.

According to the second aspect described above, the heat transfer medium heated by one of the heat-transfer-medium heating apparatuses described above can be circulated in the radiator. Therefore, this heat transfer medium can be supplied to the radiator to serve as a heat source for heating the air. As a result, it is possible to realize a vehicular air-conditioning apparatus that is suitable for use in air-conditioning systems in vehicles that are not equipped with engines using coolant, such as electric cars. In addition, by applying it to an air-conditioning apparatus of a vehicle equipped with an engine whose coolant serves as a heat source for heating the air, it is possible to quickly heat up low temperature coolant and circulate it in the radiator at startup time, which enables the startup performance of the air-conditioning to be improved when the air-conditioning apparatus is activated.

According to the heat-transfer-medium heating apparatus of the present invention, it is possible to increase the heat radiating efficiency of the PTC heater, thus improving the heating performance. In addition, it is possible to assemble the PTC heater and the heat-transfer-medium circulating boxes in close contact, which can improve the heat-conduction properties and the ease of assembly. It is also possible to reduce the thermal resistance between the PTC elements and the heat-transfer-medium circulating boxes, which improves the heat-conduction properties, and sufficient electrical insulation can be ensured therebetween. In particular, by assembling the PTC heater and the heat-transfer-medium circulating boxes by pressing them together, it is possible to improve the contact properties therebetween by utilizing the compressibility of the compressible heat-conducting layers. Therefore, the heat-conduction properties can be further improved, and dimensional tolerance in assembly can be absorbed.

According to the vehicular air-conditioning apparatus of the present invention, it is possible to use the heat transfer medium heated by the heat-transfer-medium heating apparatus as a heat source for heating the air. Therefore, it is possible to provide a vehicular air-conditioning apparatus that is suitable for use in air conditioning systems of vehicles which are not equipped with engines using coolant, such as electric cars. In addition, by applying it to an air-conditioning apparatus in a vehicle equipped with an engine and using the coolant thereof as a heat source for heating air, it is possible to quickly heat low-temperature coolant at startup time, and it is thus possible to improve the startup performance of air conditioning when the air-conditioning apparatus is activated.

DETAILED DESCRIPTION OF THE INVENTION

Embodiments according to the present invention will be described below with reference to the drawings.

An embodiment of the present invention will be described below with reference to FIGS. 1 to 6.

Figure 1:
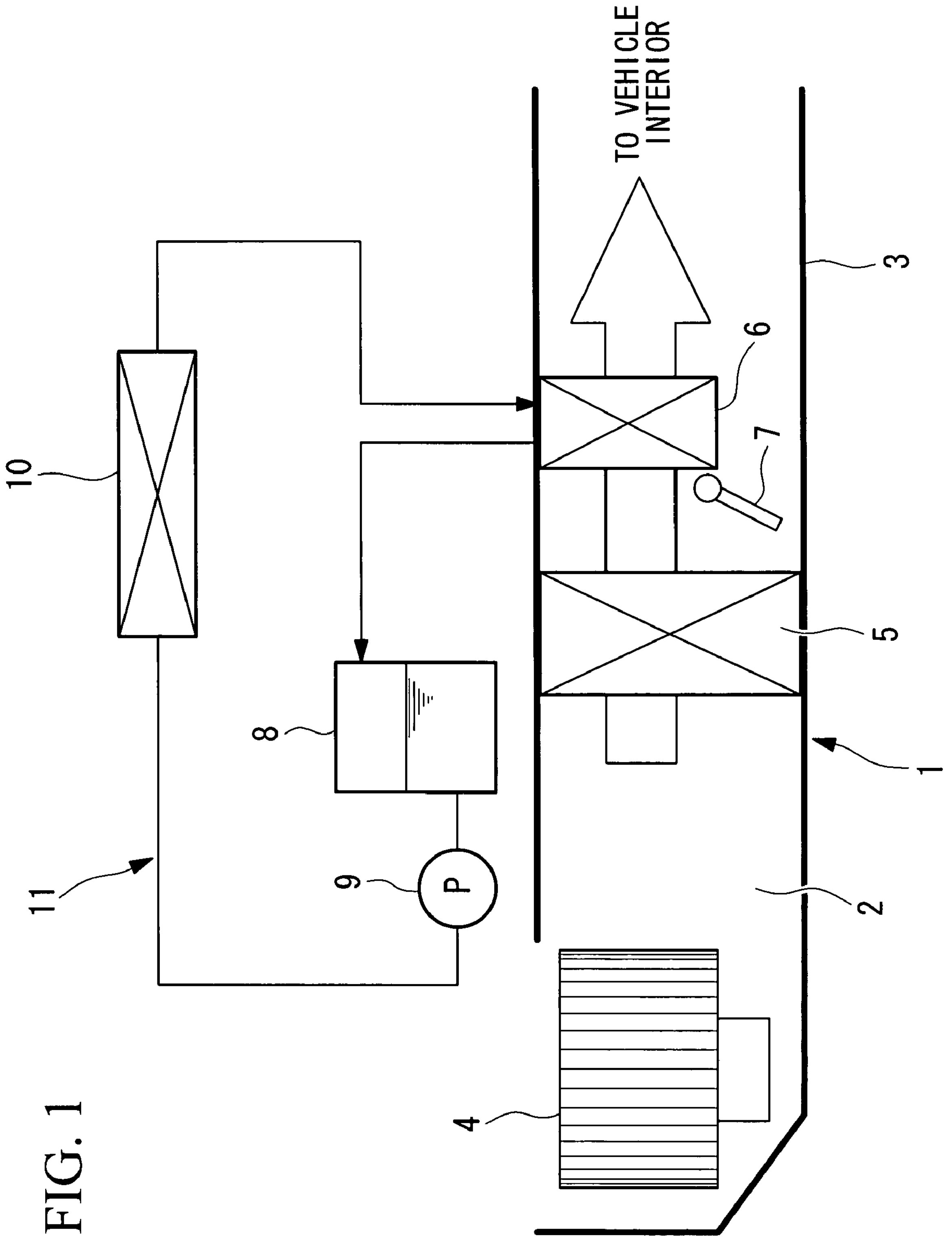
FIG. 1 is a diagram showing, in outline, a vehicular air-conditioning apparatus according to an embodiment of the present invention.

FIG. 1 shows, in outline, the configuration of a vehicular air-conditioning apparatus 1 according to this embodiment. The vehicular air-conditioning apparatus 1 takes in and regulates the temperature of outside air or vehicle cabin air and includes a casing 3 forming an air duct 2 for guiding the temperature-regulated air to the vehicle interior.

A blower 4, a cooler 5, a radiator 6, and an air-mix damper 7 are provided inside the casing 3, in this order from upstream side to the downstream side of the air duct 2. The blower 4 sucks in and pressurizes outside air or vehicle cabin air and supplies it under pressure towards the downstream side. The cooler 5 cools the air supplied by the blower 4. The radiator 6 heats the air cooled upon passing through the cooler 5. The air-mix damper 7 adjusts the mix of the volume of air passing through the radiator 6 and the volume of air bypassing the radiator 6 to regulate the temperature of the air mixed at the downstream side thereof.

The downstream side of the casing 3 is connected to a plurality of vents (not shown in the drawing) for blowing out the temperature-regulated air into the vehicle interior via a blowing mode switching damper and duct, which are not shown in the drawing.

The cooler 5 forms a refrigerant circuit together with a compressor, a condenser, and an expansion valve, which are not shown in the drawing, and cools the air passing therethrough by evaporating a refrigerant which is adiabatically expanded at the expansion valve.

The radiator 6 forms a heat-transfer-medium circulating circuit 11 together with a tank 8, a pump 9, and a heat-transfer-medium heating apparatus 10 and heats the air passing therethrough by circulation of the heat transfer medium heated by the heat-transfer-medium heating apparatus 10 via the pump 9.

Figure 2:
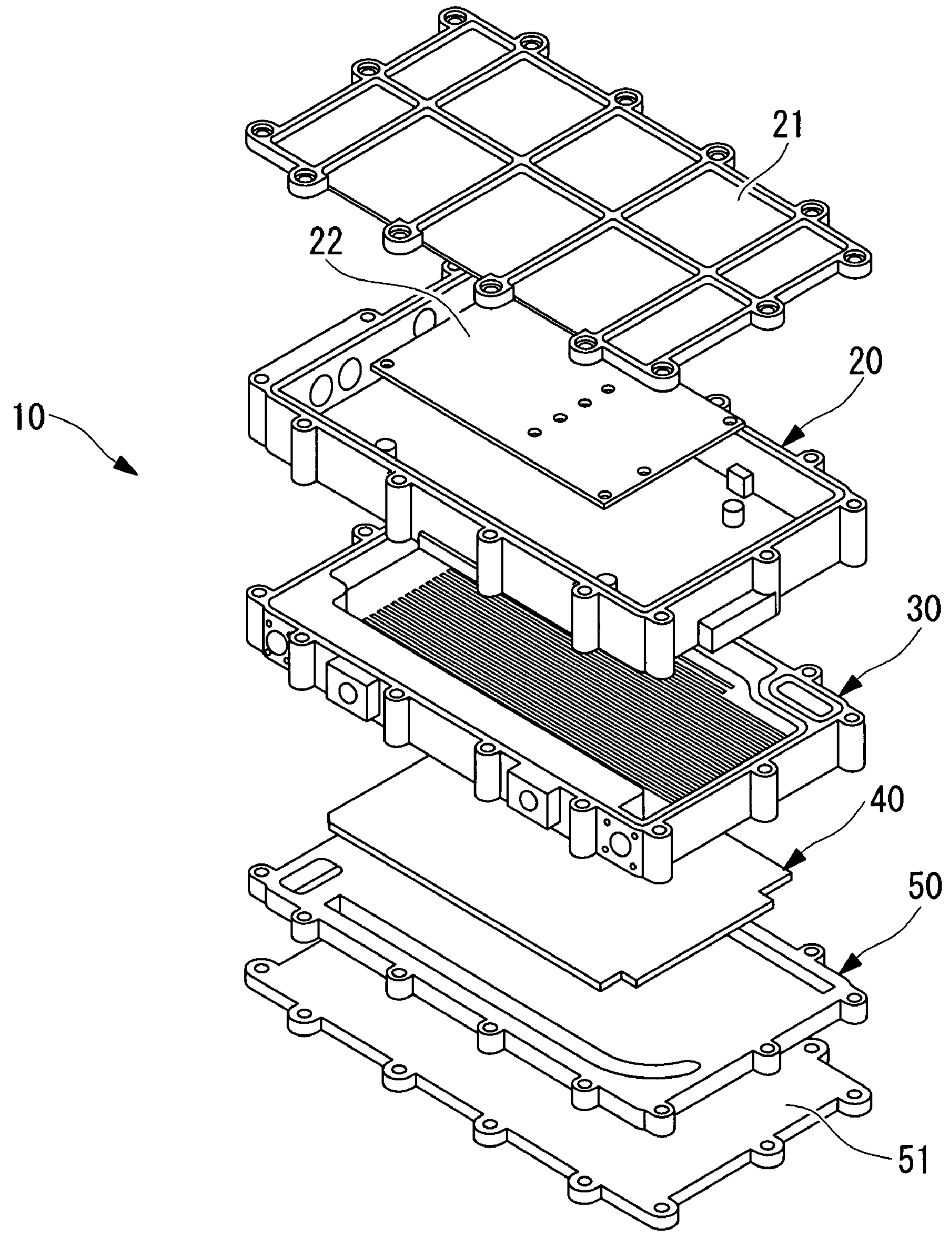
FIG. 2 is an exploded perspective view of a heat-transfer-medium heating apparatus according to an embodiment of the present invention.

FIG. 2 shows an exploded perspective view of the heat-transfer-medium heating apparatus 10 described above, and FIG. 5 shows a longitudinal sectional view thereof. The heat-transfer-medium heating apparatus 10 includes a board accommodating box 20, an upper heat-transfer-medium circulating box 30, a PTC heater 40, and a lower heat-transfer-medium circulating box 50. The board accommodating box 20 is rectangular and is provided with a cover 21. The upper heat-transfer-medium circulating box 30 has the same rectangular shape as the board accommodating box 20. The PTC heater 40 has a smaller rectangular shape than the upper heat-transfer-medium circulating box 30. The lower heat-transfer-medium circulating box 50 has the same rectangular shape as the upper heat-transfer-medium circulating box 30 and is provided with a cover 51. These parts are stacked in the order described above and are integrated to form a single body by securely screwing them together with bolts (not shown in the drawing).

Figure 5:
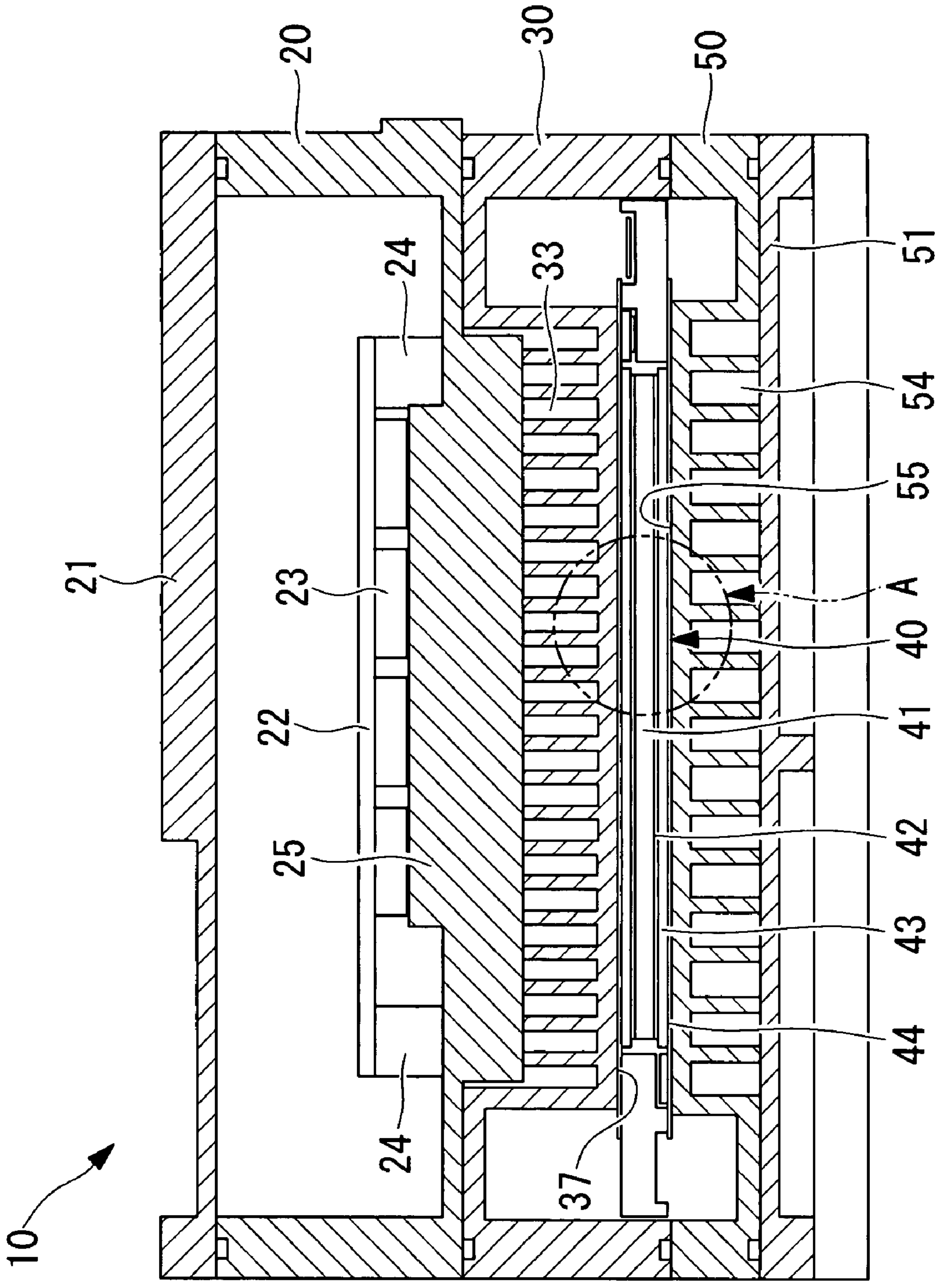
FIG. 5 is a longitudinal sectional view of the heat-transfer-medium heating apparatus shown in FIG. 2.

As shown in FIG. 5, the board accommodating box 20 is a rectangular box member, formed of a heat conducting material such as an aluminum alloy, whose upper surface is sealed with the cover 21, and a control board 22 for controlling the PTC heater 40 is accommodated inside. The control board 22 has heat-generating components, such as FETs (field effect transistors) 23, and control circuits integrated thereon and is supplied with a high voltage of 300 V for driving the PTC heater 40 and a low voltage of 12 V used for control. This control board 22 is secured to support portions 24 which project from the bottom surface of the board accommodating box 20 by screwing it at the four corners. The heat-generating components such as the FETs 23 are disposed on the lower surface of the control board 22 and are in contact with the upper surface of a cooling portion 25 provided on the bottom surface of the board accommodating box 20 via an insulating layer which is not shown in the drawing. The cooling portion 25 and the heating components such as the FETs 23 are disposed close to an inlet side of heat-transfer-medium circulating channels (described later) provided in the upper heat-transfer-medium circulating box 30 to increase the cooling effect on the heating components.

Figure 3:
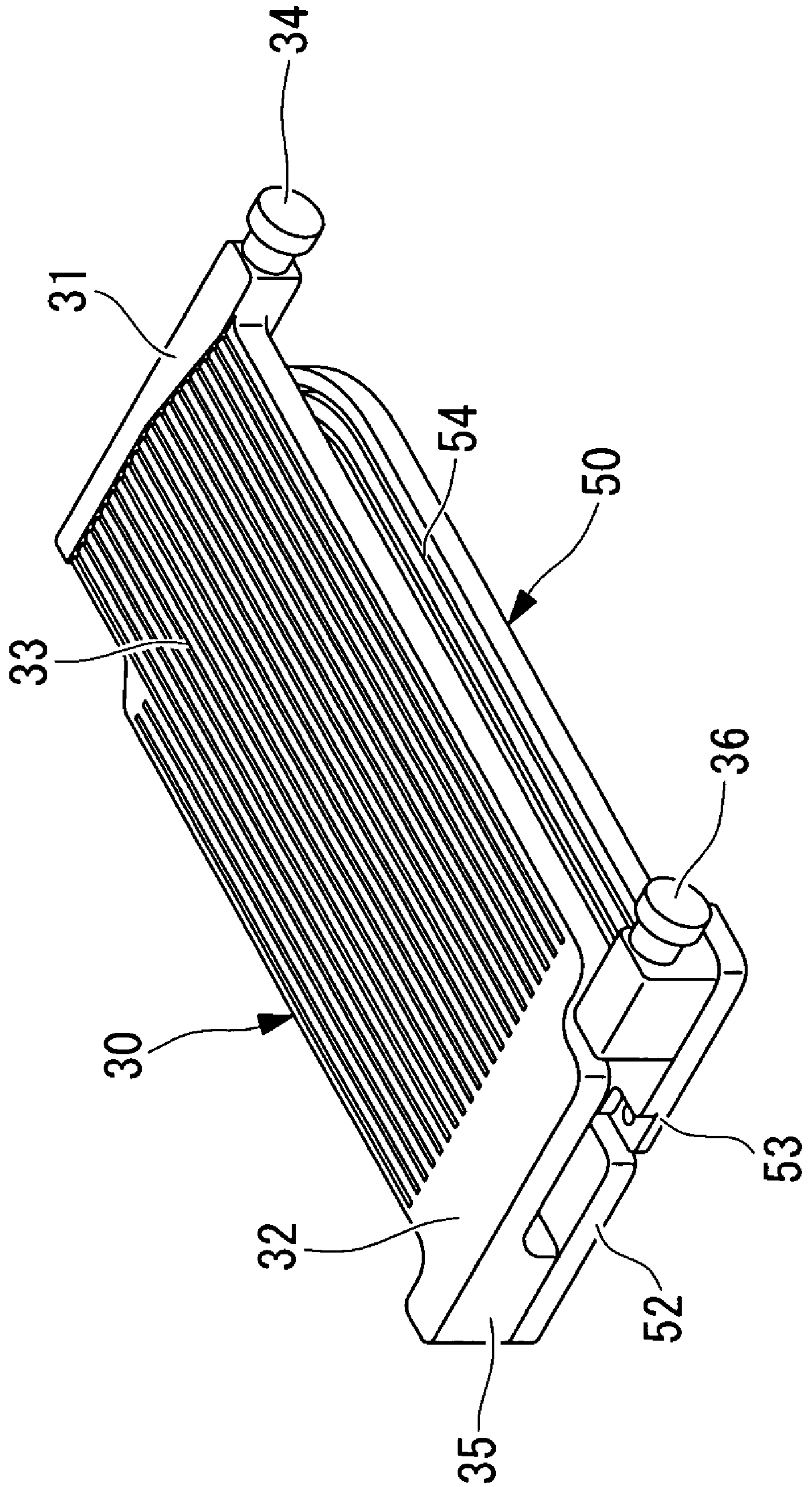
FIG. 3 is a perspective view showing a heat-transfer-medium flow path in heat-transfer-medium circulating boxes in the heat-transfer-medium heating apparatus shown in FIG. 2.
Figure 4:
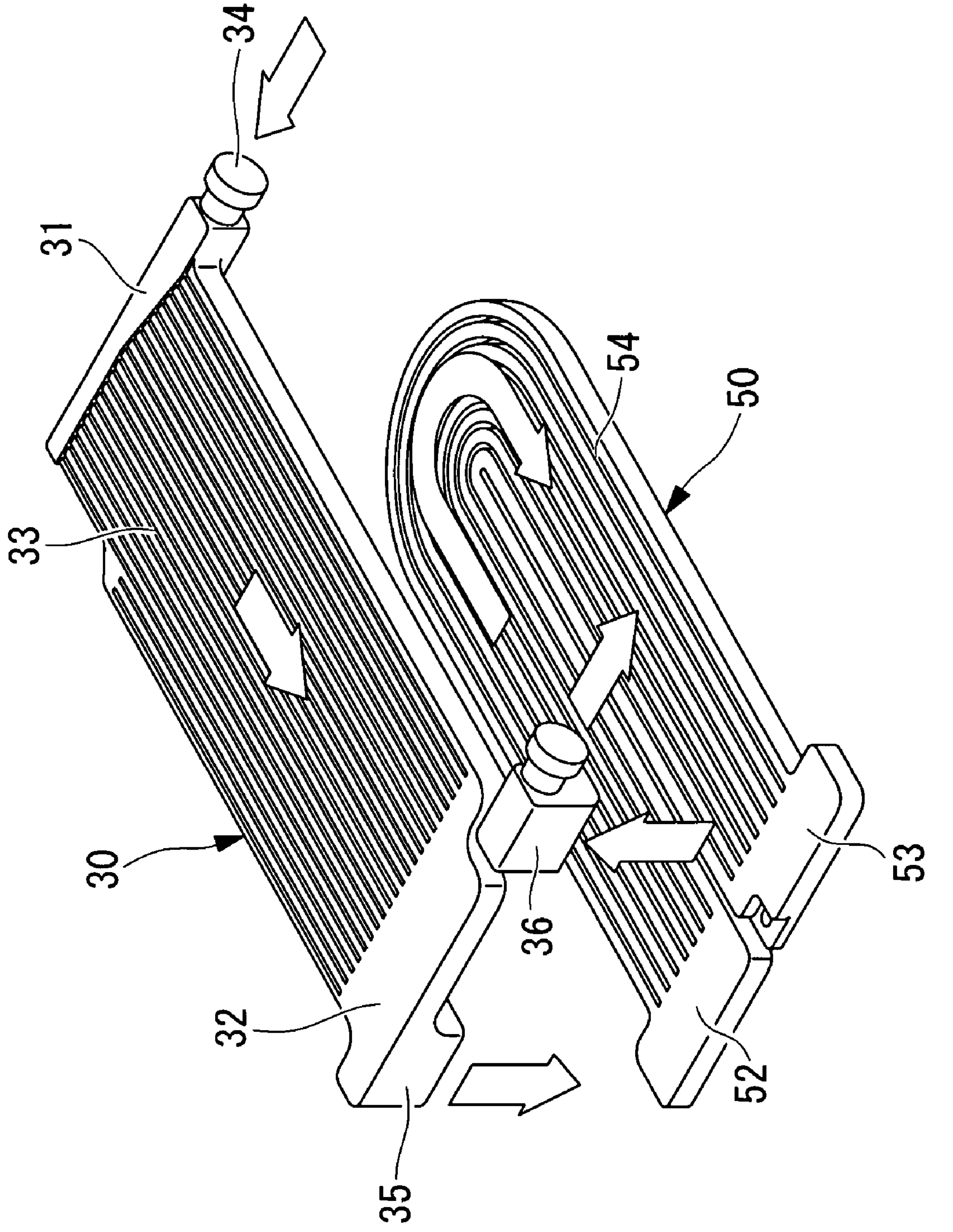
FIG. 4 is an exploded perspective view showing the heat-transfer-medium flow path in the heat-transfer-medium circulating boxes in the heat-transfer-medium heating apparatus shown in FIG. 2.

FIGS. 3 and 4 show a heat-transfer-medium flow path in the upper heat-transfer-medium circulating box 30.

The upper heat-transfer-medium circulating box 30 is a rectangular box member formed of a heat conducting material such as an aluminum alloy and includes, at the upper surface thereof, an inlet head 31 and an outlet head 32, forming a pair at both ends, and a plurality of separate parallel groove-shaped circulating channels 33 formed between the inlet head 31 and the outlet head 32. The upper surface of the inlet head 31, the outlet head 32, and the circulating channels 33 is sealed off by the bottom surface of the board accommodating box 20 described above (see FIG. 5). Accordingly, a flow path for the heat transfer medium is formed inside the upper heat-transfer-medium circulating box 30, wherein the heat transfer medium flowing in through the inlet head 31 is split into the plurality of circulating channels 33, simultaneously flows through the circulating channels 33 in parallel, and reaches the outlet head 32. In addition, a control board cooling structure is provided in which the cooling portion 25 provided on the bottom surface of the board accommodating box 20 is cooled by the heat transfer medium circulating inside the circulating channels 33 described above.

A heat-transfer-medium inlet 34 is provided in the inlet head 31 described above. A communication port 35 to the lower heat-transfer-medium circulating box 50 and an outlet 36 which is separated from the outlet head 32 and through which the heat transfer medium flowing in from the lower heat-transfer-medium circulating box 50 is made to flow out are provided in the outlet head 32.

A depressed surface 37 (see FIGS. 5 and 6) for accommodating the PTC heater 40 is provided at the lower surface of the upper heat-transfer-medium circulating box 30. This depressed surface 37 opposes the rear surface of the circulating channels 33 through which the heat transfer medium circulates and is flat so that the PTC heater 40 is placed in close contact therewith.

Figure 6:
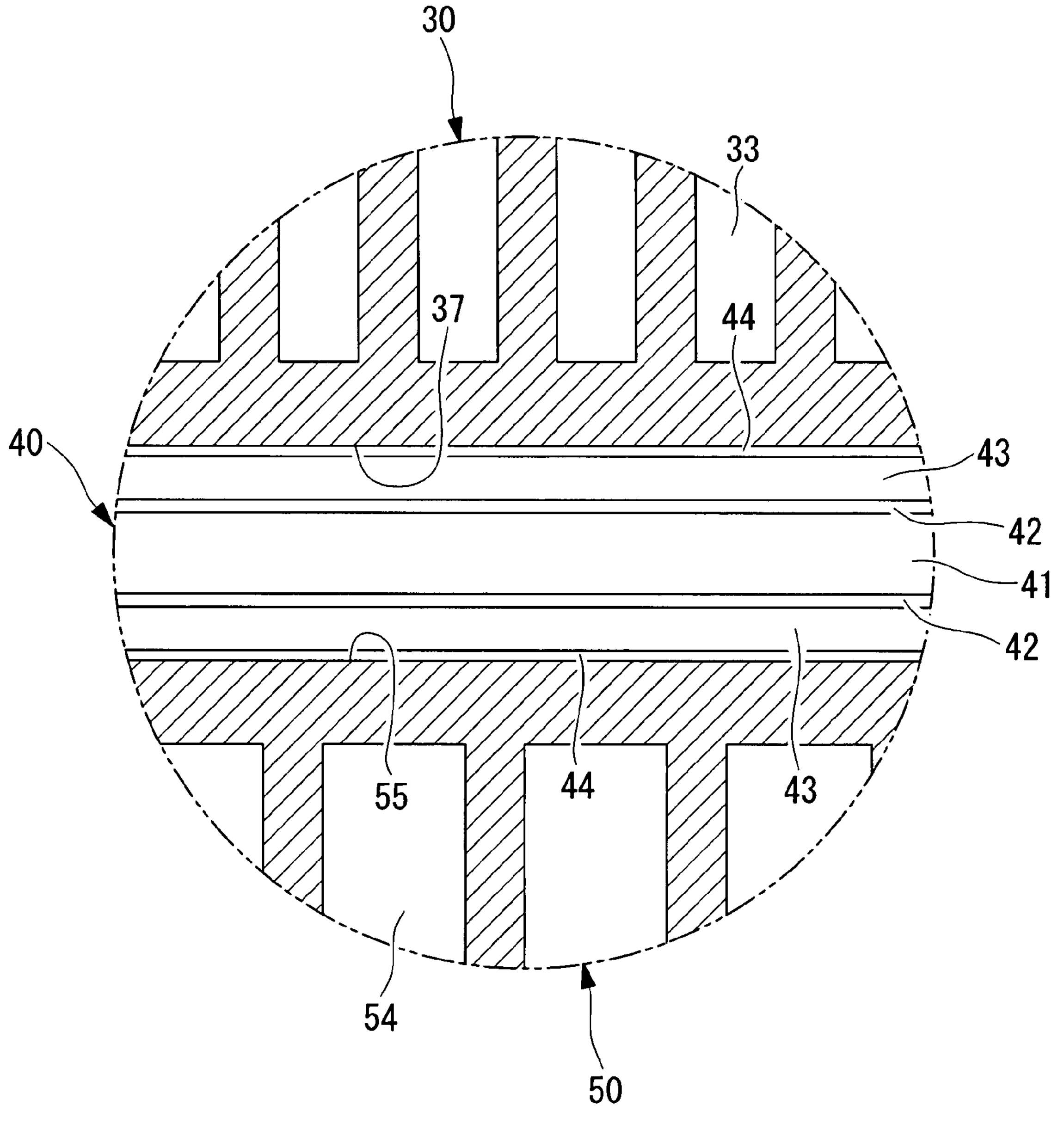
FIG. 6 is a magnified sectional view of part A in FIG. 5.

FIGS. 5 and 6 show the configuration of the PTC heater 40.

The PTC heater 40 uses flat plate-shaped PTC elements 41 formed in a rectangular shape as heat-generating elements, and has a stacked structure in which electrode plates 42, incompressible insulating layers 43, and compressible heat-conducting layers 44 are sequentially stacked on both surfaces of the PTC elements 41 to sandwich them.

A plurality, for example, four, of the PTC elements 41 are disposed side by side, and they are configured so as to be controlled on/off in units of individual PTC elements 41 by the control circuit integrated on the control boards 22.

The electrode plates 42, which are for supplying electrical power to the PTC elements 41, are sheets with the same rectangular shape as the PTC elements 41, and are electrically conducting and heat conducting.

The incompressible insulating layers 43 are rectangular sheets, formed of an insulating material such as alumina, and are heat conducting. The incompressible insulating layers 43 have a larger surface area than the electrode plates 42, so that the four edges thereof extend slightly further outward than the four edges of the electrode plates 42 when stacked on the outer surfaces of the electrode plates 42 (see FIG. 5).

The incompressible insulating layers 43 are formed with a thickness of 1.0 mm or more and 2.0 mm or less. This is to minimize the thermal resistance between the PTC elements 41 and electrode plates 42, and the upper heat-transfer-medium circulating box 30 and lower heat-transfer-medium circulating box 50 provided at the outer sides thereof, as well as to ensure sufficient electrical insulation. Even if the incompressible insulating layer 43 is broken, the thickness is at least 1.0 mm so that insulation is ensured by an air layer.

The compressible heat-conducting layers 44 are a rectangular sheets having compressibility, are formed of insulating sheets such as a silicone sheets, and are heat conducting. These compressible heat-conducting layers 44 have a larger surface area than the incompressible insulating layers 43, so that the four edges thereof extend significantly farther outward than the four edges of the electrode plates 42, when laminated on the outer surfaces of the incompressible insulating layers 43 (see FIG. 5).

When the compressible heat-conducting layers 44 are formed of silicone sheets, the thickness thereof is 0.4 mm or more and 2.0 mm or less. This is to restrict the thickness to 2.0 mm or less to minimize the thermal resistance between the PTC elements 41 serving as the heat-generating elements and the upper heat-transfer-medium circulating box 30 and the lower heat-transfer-medium circulating box 50. Another reason is that, setting the thickness to at least 0.4 mm ensures a sufficient compression effect so that, when the PTC heater 40 is assembled between the upper heat-transfer-medium circulating box 30 and the lower heat-transfer-medium circulating box 50, by utilizing the compressibility, the upper heat-transfer-medium circulating box 30 and the lower heat-transfer-medium circulating box 50 are reliably placed in close contact with the PTC heater 40, and in addition, dimensional tolerance in assembly are absorbed.

FIGS. 3 and 4 show a heat-transfer-medium flow path in the lower heat-transfer-medium circulating box 50.

The lower heat-transfer-medium circulating box 50 is a rectangular box member formed of a heat-conducting material such as aluminum alloy and includes, at the lower surface thereof, an inlet head 52 and an outlet head 53 forming a pair at one end and a plurality of separate parallel groove-shaped circulating channels 54 which extend from the inlet head 52 to the other end and which form a U-turn at the other end to return to the outlet head 53. The lower surface of the inlet head 52, the outlet head 53, and the circulating channels 54 is sealed off by the cover 51. Accordingly, a flow path for the heat transfer medium is formed inside the lower heat-transfer-medium circulating box 50, wherein the heat transfer medium flowing in through the inlet head 52 is split into the plurality of circulating channels 54 by the inlet head 52, simultaneously circulates through the circulating channels 54 in parallel, performs a U-turn at the other end, and reaches the outlet head 53. A higher pressure drop is expected because the circulating channels 54 are U-turn paths and are thus longer than the circulating channels 33 in the upper heat-transfer-medium circulating box 30. Therefore, the circulating channels 54 are formed with a larger width than the width of the circulating channels 33 (see FIGS. 5 and 6).

The inlet head 52 of the lower heat-transfer-medium circulating box 50 communicates with the communicating hole 35 provided in the outlet head 32 of the upper heat-transfer-medium circulating box 30, and the heat transfer medium flowing in the upper heat-transfer-medium circulating box 30 flows in therethrough. Also, the outlet head 53 of the lower heat-transfer-medium circulating box 50 communicates with the outlet 36 provided in the outlet head 32 of the upper heat-transfer-medium circulating box 30, but so as to be separate therefrom, thus forming a path through which the heat transfer medium is made to flow to the outside through the lower heat-transfer-medium circulating box 50.

The upper surface of the lower heat-transfer-medium circulating box 50 defines a flat surface 55 (see FIGS. 5 and 6), and by sandwiching the PTC heater 40 between the flat surface 55 and the flat depressed surface 37 of the upper heat-transfer-medium circulating box 30, the surfaces 37 and 55 are pressed in contact with the compressible heat-conducting layers 44 of the PTC heater 40.

FIG. 3 shows a perspective view of the heat-transfer-medium flow path when the upper heat-transfer-medium circulating box 30 and the lower heat-transfer-medium circulating box 50 are stacked on either side to sandwich the PTC heater 40.

Thus, the PTC heater 40 is configured such that it is possible to radiate heat from both surfaces to the heat transfer medium circulating in the upper heat-transfer-medium circulating box 30 and the lower heat-transfer-medium circulating box 50 provided in close contact with the two surfaces thereof, thus heating up the heat transfer medium.

FIG. 4 shows the heat-transfer-medium flow path formed by the upper heat-transfer-medium circulating box 30 and the lower heat-transfer-medium flow circulating box 50.

The heat-transfer-medium circulating circuit 11 is connected to the inlet 34 of the upper heat-transfer-medium circulating box 30. Low-temperature heat transfer medium supplied at pressure from the pump 9 flows into the inlet head 31 from the inlet 34 and is split into the individual circulating channels 33. After the heat transfer medium circulating in the individual circulating channels 33 towards the outlet head 32 is combined at the outlet head 32, it flows into the inlet head 52 of the lower heat-transfer-medium circulating box 50 via the communicating hole 35. After this heat transfer medium is split into the individual circulating channels 54 in the inlet head 52, circulates inside each circulating channel 54, and performs a U-turn at the other end, it reaches the outlet head 53, where it is recombined. The heat transfer medium then flows out to the heat-transfer-medium circulating circuit 11 from the outlet 36 communicating with the outlet head 53. A flow path for the heat transfer medium is thus formed by the above configuration.

Next, the operation of the vehicular air-conditioning apparatus 1 and the heat-transfer-medium heating apparatus 10 according to this embodiment will be described.

In the vehicular air-conditioning apparatus 1, the outside air or vehicle cabin air drawn into the blower 4 is supplied under pressure to the cooler 5, where it is performs heat exchange with the refrigerant circulating in the cooler 5, thus being cooled. This cool air is then branched by the air-mix damper 7. One part flows into the radiator 6 and the other part bypasses the radiator 6. After the air which is heated up in the radiator 6 is mixed with the air bypassing the radiator 6 at the downstream side thereof to regulate it to a predetermined temperature, it is blown out into the vehicle cabin. Accordingly, the temperature of the vehicle cabin interior is regulated.

The air heating by the radiator 6 is achieved by radiating heat from the high-temperature heat transfer medium circulating in the heat-transfer-medium circulating circuit 11. The heat transfer medium in the heat-transfer-medium circulating circuit 11 is supplied from the tank 8 to the heat-transfer-medium heating apparatus 10 via the pump 9, where it is heated to about 80° C. and supplied to the radiator 6. The heat transfer medium at this temperature is subjected to heat exchange with air which is cooled and dehumidified by the cooler 5 while circulating in the radiator 6, radiates heat to the air to reduce the temperature, and returns back to the tank 8. By repeating this, air heating is continuously performed by the radiator 6.

In the heat-transfer-medium heating apparatus 10, low-temperature heat transfer medium flows in from the inlet 34 in the upper heat-transfer-medium circulating box 30 to the inlet head 31. The temperature of this heat transfer medium is raised by the PTC heater 40 while it circulates the circulating channels 33 after being split at the inlet head 31, and it reaches the outlet head 32. The heat transfer medium combined at the outlet head 32 flows into the inlet head 52 of the lower heat-transfer-medium circulating box 50 via the communicating hole 35, and while it circulates in the circulating channels 54 after being split by the inlet head 52, its temperature is raised again by the PTC heater 40, and it reaches the outlet head 53. In this way, while the heat transfer medium is circulating in the upper heat-transfer-medium circulating box 30 and the lower heat-transfer-medium circulating box 50, its temperature is raised to produce high-temperature heat transfer medium at about 80° C., which flows out from the outlet head 53 to the heat-transfer-medium circulating circuit 11 via the outlet 36.

A high voltage is applied from the control board 22 to the PTC elements 41, serving as heat-generating elements, of the PTC heater 40 via the electrode plates 42. Thus, the PTC elements 41 generate heat which is radiated from both surfaces thereof. This heat is conducted to the upper heat-transfer-medium circulating box 30 and the lower heat-transfer-medium circulating box 50 via the electrode plates 42, the incompressible insulating layers 43, and the compressible heat-conducting layers 44, which are in close contact with the PTC elements 41, thus contributing to the heating of the heat transfer medium.

The PTC elements 41, of which there are four, are switched on and off in units of individual PTC elements 41 by the control board 22 according to the temperature of the heat transfer medium flowing into the heat-transfer-medium heating apparatus 10, thus controlling the heating capacity. Thus, it is possible to heat the heat transfer medium to a predetermined temperature and discharge it.

The high voltage applied to the PTC elements 41 is electrically isolated from the upper heat-transfer-medium circulating box 30 and the lower heat-transfer-medium circulating box 50 by the incompressible insulating layers 43 disposed on the surfaces at both sides thereof. In this embodiment, because the compressible heat-conducting layers 44 are also formed of insulating sheets such as silicone sheets, they also function as insulating layers. Thus, forming double insulating layers enhances the electrical insulation. The surface area of the incompressible insulating layers 43 is larger than that of the electrode plates 42, and the surface area of the compressible heat-conducting layers 44 is in turn larger than that of the incompressible insulating layers 43; thus, the four edges thereof extend further outward than the four edges of the electrode plates 42 and the incompressible insulating layers 43. Therefore, short circuits can be reliably prevented between the PTC elements 41 and electrode plates 42, and the upper heat-transfer-medium circulating box 30 and lower heat-transfer-medium circulating box 50.

Heat-generating components such as the FETs 23 are provided on the control board 22 controlling the PTC heater 40; the heat-generating components such as the FETs 23 are provided on the lower surface of the control boards 22 and are in contact with the cooling portion 25 provided on the bottom surface of the board accommodating box 20. The cooling portion 25, which is in contact with the heat-transfer-medium circulating channels 33 in the upper heat-transfer-medium circulating box 30, is at a lower temperature than the heat-generating components such as the FETs 23 due to the heat transfer medium circulating inside. Therefore, the heat-generating components are forcibly cooled by the circulating heat transfer medium. In addition, because the heat-generating components such as the FETs 23 and the cooling portion 25 are disposed in the vicinity of the inlet side of the heat-transfer-medium circulating channels 33, they are efficiently cooled by the heat transfer medium, which is still at a low temperature, in the vicinity of the inlet.

This embodiment affords the following advantages.

Heat is radiated from both surfaces of the PTC heater 40, thus heating the heat transfer medium circulating in the upper heat-transfer-medium circulating box 30 and the lower heat-transfer medium circulating box 50. Therefore, it is possible to increase the heat-radiating efficiency of the PTC heater 40 and improve the heating performance. In addition, a stacked structure is provided in which the PTC heater 40 is sandwiched by the upper heat-transfer-medium circulating box 30 and the lower heat-transfer-medium circulating box 50, thus placing the upper heat-transfer-medium circulating box 30 and the lower heat-transfer-medium circulating box 50 in close contact with the two surfaces of the PTC heater 40. Therefore, it is possible to assemble the PTC heater 40, the upper heat-transfer-medium circulating box 30, and the lower heat-transfer-medium circulating box 50 in close contact with each other, which improves the heat-conducting properties and the ease of assembly.

Because the PTC heater 40 has a stacked construction in which the electrode plates 42, the incompressible insulating layers 43, and the compressible heat-conducting layers 44 are sequentially provided on both surfaces of the PTC elements 41, the thermal resistance between the PTC elements 41 and the upper heat-transfer-medium circulating box 30 and lower heat-transfer-medium circulating box 50 is reduced, thus increasing the heat-conduction properties, and in addition, it is possible to ensure sufficient electrical insulation therebetween. In particular, by utilizing the compressibility of the compressible heat-conducting layers 44, it is possible to assemble the PTC heater 40 and the upper and lower heat-transfer-medium circulating boxes 30 and 50 by pressing them together, thus improving the contact properties between these parts. As a result, it is possible to improve the heat-conducting properties and to absorb dimensional tolerance in assembly.

Because the incompressible insulating layers 43 have a thickness of 1.0 mm or more and 2.0 mm or less, it is possible to sufficiently reduce the thermal resistance between the PTC elements 41 and electrode plates 42, and the upper heat-transfer-medium circulating box 30 and lower heat-transfer-medium circulating box 50 which are provided at the outer sides thereof, and it is also possible to ensure sufficient electrical insulation therebetween. In addition, even if the incompressible insulating layers 43 are broken, because it is possible to ensure an air layer of at least 1.0 mm, it is possible to maintain insulation.

By forming the compressible heat-conducting layers 44 of insulating sheets such as silicone sheets, they can also function as insulating layers. Therefore, it is possible to form a double insulating layer structure, which allows the electrical insulation properties to be enhanced. In addition, because these insulating sheets (silicone sheets) have a thickness of 0.4 mm or more and 2.0 mm or less, it is possible to ensure the required compressibility while at the same time sufficiently reducing the thermal resistance.

The surface area of the incompressible insulating layers 43 is larger than that of the electrode plates 42, and the surface area of the compressible heat-conducting layers 44 is in turn larger than that of the incompressible insulating layers 43. Therefore, it is possible to make the four edges thereof extend further outward than the four edges of the electrode plates 42 and the incompressible insulating layers 43. As a result, it is possible to reliably prevent short circuits between the PTC elements 41 and electrode plates 42, and the upper heat-transfer-medium circulating box 30 and lower heat-transfer-medium circulating box 50, and it is thus possible to further improve the electrical insulation properties.

The circulating channels 33 and 54 in the upper heat-transfer-medium circulating box 30 and the lower heat-transfer-medium circulating box 50 provided on the two surfaces of the PTC heater 40 communicate with each other, thus lengthening the flow path of the heat transfer medium. Therefore, it is possible to increase the contact length with respect to the PTC heater 40, which allows the heating performance of the heat transfer medium to be increased. In addition, because the capacity of the PTC heater 40 can be controlled according to the temperature of the heat transfer medium, it is possible to stably supply heat transfer medium which has been heated to a predetermined temperature.

The control board 22 having the heat-generating components such as the FETs 23 is disposed inside the board accommodating box 20 connected to the upper heat-transfer-medium circulating box 30, so as to be forcibly cooled by the heat transfer medium circulating in the upper heat-transfer-medium circulating box 30. Therefore, the control board 22 can be thermally stabilized, thus improving the heat resistance and reliability thereof. In particular, because the heat-generating components are in contact with the cooling portion 25 provided in the board accommodating box 20 to allow it to be cooled by heat conduction, it is possible to further increase the cooling effect. Moreover, because the heat-generating components and the cooling portion 25 are disposed close to the inlet side of the upper heat-transfer-medium circulating box 30, it is possible to efficiently cool them with comparatively low-temperature heat transfer medium.

Because the vehicular air-conditioning apparatus 1 of this embodiment includes the heat-transfer-medium heating apparatus 10, and the heat transfer medium heated by this heat-transfer-medium heating apparatus 10 is circulated in the radiator 6 to serve as a heat source for the air, it is suitable for use in air-conditioning apparatuses in vehicles that are not equipped with an engine using coolant, such as an electric car. However, it is not limited to this application and may be similarly employed in air-conditioning apparatuses of vehicles equipped with an engine whose coolant functions as a heat source for heating the air at a radiator. In such a case, because low-temperature coolant can be quickly heated and circulated in the radiator when the air-conditioning apparatus is activated, it is possible to improve the startup performance of the air conditioner.

The embodiment described above has been described using an example in which the heat transfer medium is circulated from the upper heat-transfer-medium circulating box 30 to the lower heat-transfer-medium circulating box 50. However, it may be circulated in the opposite direction from the lower heat-transfer-medium circulating box 50 to the upper heat-transfer-medium circulating box 30. In this case, to maintain the cooling performance of the control board 22, the board accommodating box 20 can be disposed at the side where the lower heat-transfer-medium circulating box 50 is located.

What is claimed is:

1. A heat-transfer-medium heating apparatus comprising:

a PTC heater having a stacked construction in which an electrode plate, an incompressible insulating layer, and a compressible heat-conducting layer are sequentially provided on each surface of a PTC element so as to sandwich the PTC element; and heat-transfer-medium circulating boxes, respectively disposed in close contact with the two surfaces of the PTC heater and having circulating channels for the heat-transfer-medium formed therein, wherein the heat transfer medium circulating inside the heat-transfer-medium circulating boxes is heated by radiant heat from the two surfaces of the PTC heater, a board accommodating box is provided on the surface of one of the heat-transfer-medium circulating boxes, at the opposite side from the surface contacting the PTC heater, and a control board configured to control the PTC heater is accommodated inside the board accommodating box, and heat-generating components provided on a lower surface of the control board are disposed on an upper surface of a cooling portion provided on the bottom surface of the board accommodating box via an insulating layer, the heat-generating components are disposed in the vicinity of an inlet in the heat-transfer-medium circulating channel in the heat-transfer-medium circulating box.

2. A heat-transfer-medium heating apparatus according to claim 1, wherein the heat-transfer-medium circulating channels in the heat-transfer-medium circulating boxes provided at the two surfaces of the PTC heater communicate with each other.

3. A heat-transfer-medium heating apparatus according to claim 1, wherein the heat-generating components are disposed in contact with a portion that is cooled by the heat transfer medium circulating through the heat-transfer-medium circulating box.

4. A heat-transfer-medium heating apparatus according to claim 1, wherein the compressible heat-conducting layers are formed of insulating material.

5. A heat-transfer-medium heating apparatus according to claim 1, wherein a surface area of the incompressible insulating layers is larger than a surface area of the electrode plates.

6. A heat-transfer-medium heating apparatus according to claim 4, wherein a surface area of the compressible heat-conducting layers is larger than a surface area of the incompressible insulating layers.

7. A heat-transfer-medium heating apparatus according to claim 5, wherein a surface area of the compressible heat-conducting layers is larger than the surface area of the incompressible insulating layers.

8. A heat-transfer-medium heating apparatus according to claim 1, wherein a plurality of the PTC elements is provided, which are configured to be controllable on and off in units of individual PTC elements.

9. A vehicular air-conditioning apparatus comprising:

a blower configured to circulate outside air or vehicle cabin air;

a cooler provided at a downstream side of the blower; and a radiator provided at a downstream side of the cooler, wherein a heat-transfer-medium heated by the heat-transfer-medium heating apparatus according to claim 1 is configured so as to be capable of circulating in the radiator.

10. A heat-transfer-medium heating apparatus according to claim 1, wherein the PTC heater and the heat-transfer-medium circulating boxes are assembled in close contact by the compressible heat-conducting Layers having compressibility.

* * * * *